United States Patent
Drab et al.

(10) Patent No.: US 9,296,110 B2
(45) Date of Patent: Mar. 29, 2016

(54) GRIPPING OR CLAMPING DEVICE

(71) Applicant: Schunk GmbH & Co. KG Spann- und Greiftechnik, Lauffen am Neckar (DE)

(72) Inventors: Michael Drab, Goeppingen (DE); Matthias Quaas, Abstatt/Happenbach (DE)

(73) Assignee: Schunk GmbH & Co. KG Spann- und Greiftechnik, Lauffen am Neckar (DE)

( * ) Notice: Subject to any disclaimer, the term of this patent is extended or adjusted under 35 U.S.C. 154(b) by 0 days.

(21) Appl. No.: 14/350,092

(22) PCT Filed: Oct. 8, 2012

(86) PCT No.: PCT/EP2012/069881
§ 371 (c)(1),
(2) Date: Jul. 8, 2015

(87) PCT Pub. No.: WO2013/050604
PCT Pub. Date: Apr. 11, 2013

(65) Prior Publication Data
US 2015/0343646 A1    Dec. 3, 2015

(30) Foreign Application Priority Data

Oct. 7, 2011    (DE) .................... 20 2011 106 379 U

(51) Int. Cl.
*B66C 1/42* (2006.01)
*B25J 15/00* (2006.01)

(52) U.S. Cl.
CPC .................................. *B25J 15/0028* (2013.01)

(58) Field of Classification Search
CPC .. B25J 15/0028; B25J 15/026; B25J 15/0266; B25J 15/028; B25J 15/0253; B25J 15/0273; B25J 15/0286; B25J 15/0293; F16F 1/36

USPC ............... 294/119.1, 207; 901/38, 37; 269/34
See application file for complete search history.

(56) References Cited

U.S. PATENT DOCUMENTS

| | | | | |
|---|---|---|---|---|
| 4,707,013 A * | 11/1987 | Vranish | ................. | B25J 15/026 294/119.1 |
| 5,184,861 A * | 2/1993 | Voellmer | ............... | B25J 15/026 294/119.1 |
| 5,947,539 A * | 9/1999 | Long | .................... | B25J 15/0028 294/119.1 |
| 6,308,431 B1 * | 10/2001 | Takanashi | ............ | B23Q 17/003 33/706 |
| 6,345,815 B1 * | 2/2002 | Takanashi | ............ | B25J 15/0273 269/224 |
| 6,827,381 B1 * | 12/2004 | Reichert | ................ | B25J 15/028 294/119.1 |
| 7,976,087 B2 * | 7/2011 | Maffeis | .................. | B25J 15/028 294/119.1 |
| 8,186,733 B2 * | 5/2012 | Geary | .................. | B25J 15/0246 294/119.1 |

(Continued)

FOREIGN PATENT DOCUMENTS

| | | |
|---|---|---|
| DE | 35 17 460 | 11/1986 |
| DE | 40 05 334 | 8/1990 |

(Continued)

*Primary Examiner* — Gabriela Puig
(74) *Attorney, Agent, or Firm* — Paul Vincent

(57) ABSTRACT

A gripping or tensioning device (10) for gripping or tensioning articles, has an electric drive (2), the drive driving a pinion (28) mounted on an output shaft (26) and jaws (12,14) which are coupled for movement with the pinion (28) and can be displaced along a base (18) by means of a jaw guide (80). The jaw guide (80) has bearing rollers (42) in the region between the jaws (12, 14) in such a manner that the rotational axes of the bearing rollers run parallel to the pinion rotational axis (84).

13 Claims, 2 Drawing Sheets

(56) References Cited

U.S. PATENT DOCUMENTS

| | | | | |
|---|---|---|---|---|
| 8,602,470 | B2 * | 12/2013 | Bieler | B25J 15/026 294/119.1 |
| 8,905,452 | B2 * | 12/2014 | Williams | B25J 15/026 294/192 |
| 8,991,886 | B2 * | 3/2015 | Schuster | B25J 15/02 294/119.1 |
| 2003/0030294 | A1 * | 2/2003 | Michler | B23B 31/16237 294/207 |
| 2005/0093318 | A1 * | 5/2005 | Bellandi | B25B 5/061 294/207 |
| 2014/0138972 | A1 * | 5/2014 | Maffeis | B25J 15/0028 294/207 |

FOREIGN PATENT DOCUMENTS

| | | |
|---|---|---|
| JP | 51-124787 | 10/1976 |
| JP | 62-015052 | 1/1987 |
| JP | 05-212688 | 8/1993 |
| JP | 2008-149402 | 7/2008 |

* cited by examiner

GRIPPING OR CLAMPING DEVICE

This application is the national stage of PCT/EP2012/069881 filed Oct. 8, 2012 and claims Paris convention priority from DE 20 2011 106 379.1 filed Oct. 7, 2011.

BACKGROUND OF THE INVENTION

The invention relates to a gripping or clamping device for gripping or clamping articles, comprising an electric drive, said drive driving a pinion mounted on an output shaft and jaws which are coupled for movement with the pinion and can be displaced along a base by means of a jaw guide.

Such gripping or clamping devices are known from the prior art of U.S. Pat. No. 4,707,013. Further gripping or clamping devices are disclosed in DE 38 06 148 A1 and U.S. Pat. No. 5,184,861.

The object of this invention is to optimize or build more compactly such a gripping or clamping device.

SUMMARY OF THE INVENTION

This object is achieved with an object having the characteristics of the independent claim. This enables a very compact design because the jaws support each other via the bearing rollers. Transverse forces are also reduced. In this way, the gripping or clamping device can be made relatively compact overall. The output shaft having the pinion can be the motor shaft of the electric drive or the output shaft of a gear unit mounted on the output side of the electric drive.

In particular, two mutually opposite jaws are provided wherein the pinion is disposed centrally between the jaws. In this way, synchronous forces can be achieved when the jaws move closer together or further apart.

Moreover, the rotational axes of the bearing rollers and the pinion rotational axis can be disposed in one axis plane. This additionally contributes toward a compact design. The axis plane preferably constitutes the central plane between the jaws. This also results in the advantageous distribution of forces in a small mounting space.

It is also advantageous if the central longitudinal plane of the bearing rollers extending perpendicularly with respect to the pinion rotational axis is disposed in or in the region of the central transverse axis of the pinion. This also results in the advantageous distribution of forces in a small mounting space.

Preferably, a protection element is provided between the pinion and the bearing rollers, which prevents contact of the pinion with the bearing rollers. The protection element can be constituted as a cap and at least partially cover the pinion.

The jaw guide also advantageously comprises two guide surface sections on the jaw side, which face away from each other and extend parallel with respect to the pinion rotational axis, and counterguide surfaces on the base side which interact therewith. The jaw guide is therefore constituted by two sides, preferably extending parallel to each other, each of which is constituted by one jaw, and by the counterguide surfaces on the base side.

It is advantageous if roller bearings and preferably cross roller bearings are provided between the guide surface sections and the counterguide surfaces. Forces can be transmitted well via these roller bearings and easy movement between the jaws and the base is possible. Moreover, forces can be present between the pinion and the jaws extending perpendicularly with respect to the pinion rotational axis to achieve mutual support of the jaws via bearing rollers and contact of the jaws on the pinion with suitable pretensioning. In particular, the roller guides and the bearing rollers are coordinated with each other in such a way that the jaws are disposed in the transverse direction with pretensioning.

For transmission of the rotational movement of the pinion into a longitudinal movement of each jaw, it is advantageous if each jaw comprises a jaw base body and a gear rack section interacting with each pinion.

It is conceivable for the gear rack section to be movable in relation to the jaw base body in the direction of force transmission, wherein a damping element permitting elastic compliance is provided between the jaw base body and each gear rack section. This can ensure that, when gripping or clamping workpieces having the same workpiece dimension, the interacting parts of the gripping device are exposed to lower pulse-like forces due to the damping element, and therefore to lower wear. Force pulses that occur are damped due to the permitted relative movement between the jaw base body and the gear rack section and due to the damping element provided. Because of the damping element provided between the jaw base body and the gear rack section, damping is also achieved independently of the electric drive.

According to the invention, it is also conceivable for the gear rack section to be disposed on the jaw base body with pretensioning of the damping element. In this way, the gear rack section can be made to move synchronously with the jaw base body until the pretensioning force is overcome. Only when the pretensioning force is exceeded does relative movement between the gear rack section and the jaw base body begin.

The damping element is further advantageously constituted as an elastomer damper, in particular, as an elastomer block, sphere, cylinder, ring, or tube. The elastomer damper can, for example, be cast onto the jaw base body and/or onto the gear rack section. It is also conceivable, in particular, for the gear rack section to be cast into the elastomer damper, at least, in sections.

According to the invention, however, the damping element can also be constituted as a spring element, in particular, as a helical or cup spring. It is also conceivable for the damping element to be constituted as a pneumatic or hydraulic shock absorber.

In a further advantageous embodiment of the invention, the jaw base body and/or the gear rack section has guide sections for guiding the movement of the gear rack section. This ensures a defined path for the motion of the gear rack section relative to the jaw base body.

It is especially advantageous if adjustment means for adjusting the pretensioning of the damping element and/or of the gear rack section with respect to the jaw base body are provided. This enables, for example, the gear rack section to be adjusted in the direction of movement of the jaw relative to the jaw base body. Adjustment can also be performed opposing the pretensioning of the damping element. For example, adjusting screws disposed accordingly can be used for this purpose. The adjusting screws can indirectly or directly act against the gear rack section, in particular, with their free end, for example, via the damping element.

Further advantages and advantageous embodiments of the invention are to be found in the following description based on which various embodiments of the invention are described and explained in more detail.

The figures show:

DESCRIPTION OF THE PREFERRED EMBODIMENT

Figure 1:
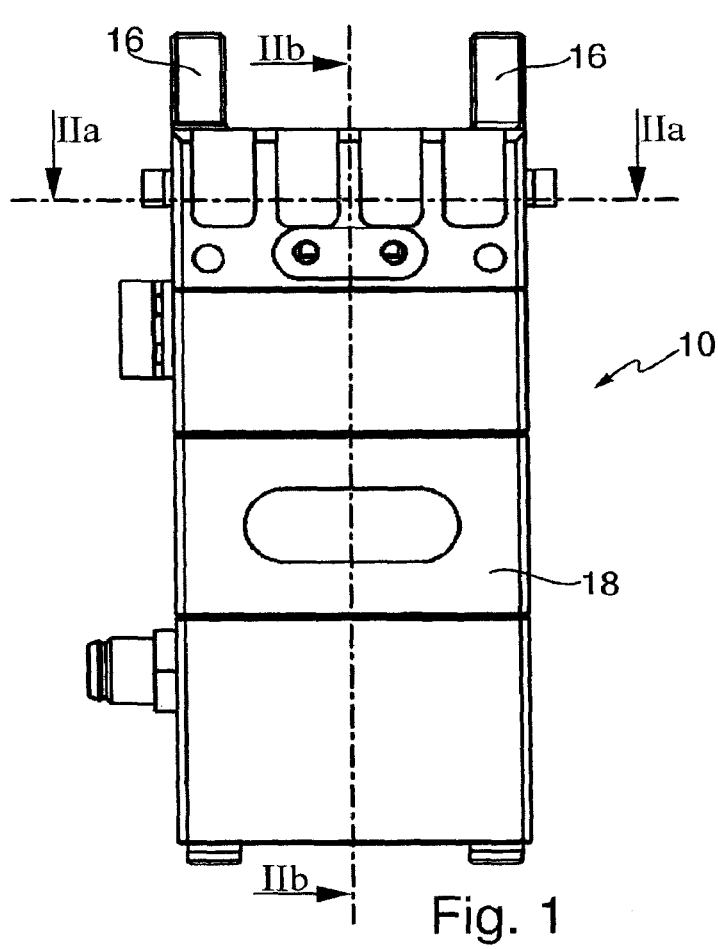
FIG. 1, front view of a first inventive gripping device.

The gripping device 10 shown in the figures comprises two jaws 12 and 14, which comprise clamping sections 16, which can move toward each other or away from each other. As is shown, in particular, in the section according to FIGS. 2a and 3, the gripping device 10 comprises a drive 20 disposed in a base 18.

The drive 20 is constituted by an electric motor 21 and a multiple-stage spur gear unit 24 coupled at the output side of the electric motor 21. For this purpose, the electric motor 21 has a drive shaft 22 that is coupled to the drive gear unit 24. The drive gear unit 24, or the drive 20, has an output shaft 26 that is coupled for movement with the clamping means 12 and 14. The coupling for movement is constituted by a pinion 28 provided on the output shaft 26 and by force introduction sections on the jaw side in the form of gear rack sections 30. As is clear from the section in FIG. 2a, two mutually opposite gear rack sections 30 are provided. The pinion 28 is disposed centrally between the gear rack sections 30 and engages with both gear rack sections 30.

Figure 2B:
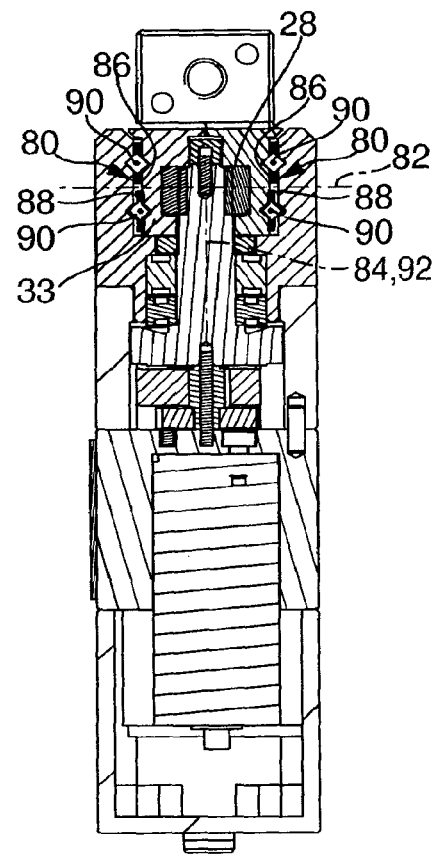
FIG. 2b, section through the gripping device according to FIG. 1 along line IIb.
Figure 2A:
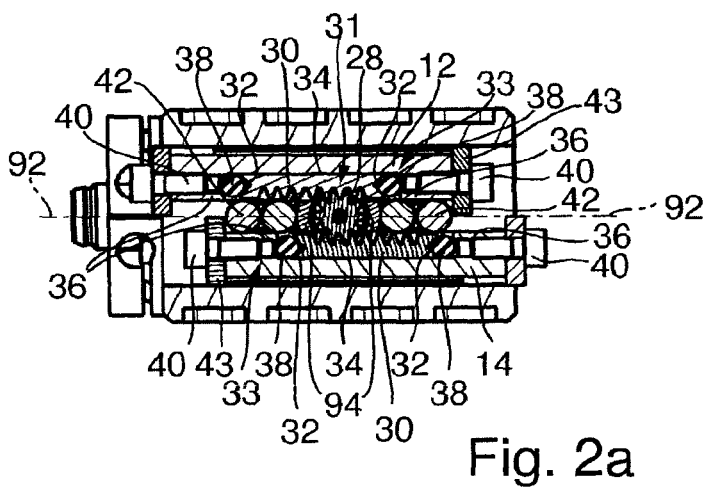
FIG. 2a, section through the gripping device according to FIG. 1 along line IIa.

As is also illustrated in FIG. 2a, each jaw 12, 14 is constituted by a jaw base body 33 and a gear rack section 30. The gear rack sections 30 each have two mutually opposite narrow sides 32, which extend transversely with respect to the direction of movement of the respective clamping element 12, 14. The gear rack sections 30 are also each disposed in pocket-like recesses 34 of each jaw base body 33. In the longitudinal direction, these recesses 34 are limited by support sections 36. Damping elements 38 in the form of elastomer cylinders or spheres are provided between each jaw-side support section 36 and the gear rack section 30 or their narrow sides 32. Provision of the damping elements 38 enables the gear rack sections 30 to be disposed in an elastically compliantly displaceable manner relative to the jaw base bodies 33 in the direction of force transmission. In this way, force pulses introduced into the gripping device 10 via the jaws 12,14 can be damped by the damping elements 38. This reduces wear overall.

The gear rack sections 30 are disposed on the jaw base bodies 33 by provision of the damping elements 38 in the direction of motion of the jaws 12, 14 with pretensioning. The jaws 12, 14 constitute force transmission elements for transmission of the force exerted by the drive 20 to the article to be gripped.

As can be seen, in particular, from FIG. 2a, adjustable adjustment screws 40 are provided on the support sections 36 of the jaw base bodies 33 in the direction of motion, which constitute an axial stop 43 in the form of a disk for bearing rollers 42, in particular, needle bearing rollers, provided between the sides of the gear rack sections 30, which face each other. It is also conceivable for the relative position of the gear rack sections 30 with respect to the jaw base bodies 33 to be adjustable via the adjustment screws 40. This can be used to compensate for manufacturing tolerances. The travel limit position of the clamping means 12, 14 can also be adjusted to some extent.

Figure 3:
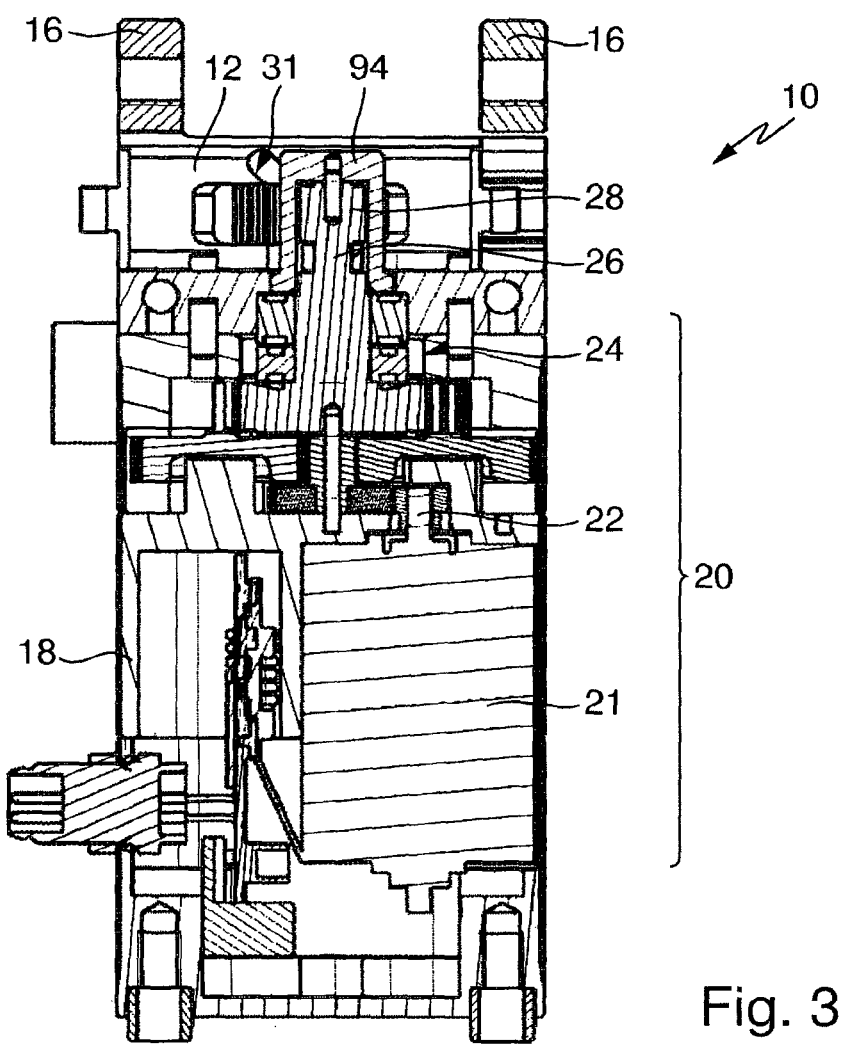
FIG. 3, a longitudinal section through the gripping device according to FIG. 1.
Figure 4:
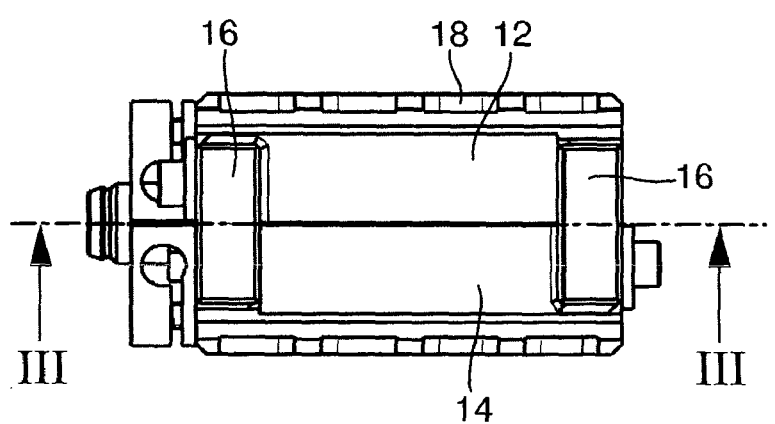
FIG. 4, a plan view of the gripping device according to FIG. 1.

Between the pinion 28 and the bearing rollers 42, a cap-like protection element 94 is provided, which prevents contact of the pinion 28 with the bearing rollers 42. As can be seen in FIG. 3, the protection element 94 is placed onto the pinion 28 in the manner of a cap and covers its upper side. The protection element is open on the side facing the gear rack sections 30, so that the pinion 28 can engage with the gear rack sections 30.

Appropriate guides are provided (not shown in the figures) to guide the movement of the gear rack sections 30 with respect to the jaw base bodies 33. Moreover, conical recesses are provided for precise location of the spherical damping elements 38 on the narrow sides 32 of the gear rack sections 30.

If the jaws 12, 14, or their clamping sections 16 now come into contact with the article to be gripped, force pulses occur within the gripping device 10, depending of the velocity of the clamping means 12, 14 and the driving force of the drive 20. Due to the provision of the damping elements 38 between the jaw base bodies 33 and the gear rack sections 30, these force pulses can be damped.

In particular, the sections shown in FIGS. 2a and 2b illustrate that the jaws are guided in the direction of motion along the base 18 by means of a jaw guide 80. The jaw guide 80 comprises two jaw-side guide sections 86 facing away from each other and base-side counterguide surfaces 88 interacting therewith. As is illustrated, in particular, in the section shown in FIG. 2b, cross rollers 90 are provided between the guide sections 86 and the counterguide surfaces 88. Cross rollers 90 are disposed along two lines extending parallel in the direction of motion of the jaws 12 and 14. As already stated, the bearing rollers 42 are provided between the jaws 12, 14. The cross rollers 90 and the bearing rollers 42 are coordinated in such a way that the jaws 12, 14 are disposed in the transverse direction with pretensioning between the sections of the base 18 providing the counterguide surfaces 88. It is also ensured that the pinion 28 engages with the gear rack sections 30 in a reliable manner.

It also becomes clear that the bearing rollers 42 of the jaw guide 80 are disposed such that the rotational axes of the bearing rollers extend parallel with respect to the pinion rotational axis 84. The rotational axes of the bearing rollers 42 and the pinion rotational axis 84 are in an axis plane 92 depicted in FIG. 2a, wherein the axis plane 92 constitutes the central plane between the jaws 12, 14.

As is illustrated, in particular, in the section according to FIG. 2b, the central transverse plane of the bearing rollers 42 is in the central transverse plane 82 of the pinion 28. The central transverse plane 82 of the pinion 28 extends perpendicularly with respect to the rotational axis 84 of the pinion 28 or the output shaft 26. The central transverse plane 82 also extends perpendicularly with respect to the pinion rotational axis 84 between the cross rollers 90 provided along a line in each case. In this way, between the jaw guide 80 and the pinion 28, or the gear rack sections 30, essentially only forces are transmitted that are in plane 82 and do not have force components extending in the direction of the pinion rotational axis 84. In this way, the device 10 can be made relatively compactly, but relatively large forces can nevertheless be transmitted.

We claim:

1. Gripping or clamping device for gripping or clamping articles, the device comprising:
    a drive mechanism, said drive mechanism having an electric drive driving a pinion mounted on an output shaft;
    jaws, said jaws being coupled for movement with said pinion and structured for displacement along a base by means of a jaw guide; and
    needle bearing rollers cooperating with said jaw guide and disposed in a region between said jaws, said needle bearing rollers having rotational axes which extend parallel to a pinion rotational axis, wherein said rotational axes of said needle bearing rollers and said pinion rotational axis are located in a common axis plane.

2. The device of claim 1, wherein said axis plane constitutes a central plane between said jaws.

3. The device of claim 1, wherein a central transverse plane of said needle bearing rollers extending perpendicularly with respect to said pinion rotational axis is located in or proximate a region of a central transverse plane of said pinion.

4. The device of claim 1, further comprising a protection element disposed between said pinion and said needle bearing rollers to prevent direct contact between said pinion and said needle bearing rollers.

5. The device of claim 1, wherein said jaw guide comprises two opposite guide surface sections facing said jaws, which extend parallel to said pinion rotational axis and which cooperate with counterguide surfaces facing said base.

6. The device of claim 5, further comprising roller guides or cross roller guides disposed between said guide surface sections and said counterguide surfaces.

7. The device of claim 6, wherein said roller guides and said needle bearing rollers are disposed, structured and dimensioned to pretension said jaws in a transverse direction.

8. The device of claim 1, wherein each of said jaws comprises a jaw base body and at least one gear rack section interacting with said pinion.

9. The device of claim 8, wherein said gear rack section can be moved relative to said jaw base body in a force transmission direction and further comprising a damping element permitting elastic compliance and disposed between said jaw base body and said gear rack section.

10. The device of claim 9, wherein said gear rack section is disposed on said jaw base body with pretensioning of said damping element.

11. The device of claim 9, wherein said damping element is an elastomer damper or an elastomer block, cylinder, sphere, ring or tube.

12. The device of claim 9, further comprising adjustment means for adjusting a pretensioning of said damping element and/or said gear rack section with respect to said jaw base body.

13. The device of claim 9, wherein said jaw base body and/or said gear rack section has guide sections for guiding movement of said gear rack section.

\* \* \* \* \*